US012604868B1

(12) United States Patent
Hobbs et al.

(10) Patent No.: US 12,604,868 B1
(45) Date of Patent: Apr. 21, 2026

(54) CAT NAIL FILE ENRICHMENT BOX

(71) Applicants:Chasity Hobbs, Carthage, NC (US);
Bradley Hobbs, Carthage, NC (US)

(72) Inventors: Chasity Hobbs, Carthage, NC (US);
Bradley Hobbs, Carthage, NC (US)

( * ) Notice: Subject to any disclaimer, the term of this patent is extended or adjusted under 35 U.S.C. 154(b) by 0 days.

(21) Appl. No.: 18/983,431

(22) Filed: Feb. 21, 2025

(51) Int. Cl.
*A01K 15/02* (2006.01)

(52) U.S. Cl.
CPC .................................. *A01K 15/024* (2013.01)

(58) Field of Classification Search
CPC ..................................................... A01K 15/024
USPC .......................................................... 119/706
See application file for complete search history.

(56) References Cited

U.S. PATENT DOCUMENTS

| | | | | | |
|---|---|---|---|---|---|
| 5,269,261 | A | * | 12/1993 | McCance | A01K 15/024 119/706 |
| 5,564,365 | A | * | 10/1996 | Kacic | A01K 15/024 119/165 |
| 6,205,955 | B1 | * | 3/2001 | Diep | A01K 15/024 132/76.5 |

| | | | | |
|---|---|---|---|---|
| 2004/0139926 | A1 | * | 7/2004 | Diep ..................... A01K 15/024 119/601 |
| 2005/0087145 | A1 | * | 4/2005 | Bordelon ............... A01K 13/00 119/600 |
| 2006/0042560 | A1 | * | 3/2006 | Novak .................. A01K 15/024 119/706 |
| 2011/0036303 | A1 | * | 2/2011 | Kimmel ............... A01K 15/024 119/706 |
| 2016/0242388 | A1 | * | 8/2016 | Chiou .................. A01K 15/025 |
| 2016/0338315 | A1 | * | 11/2016 | Floyd ................... A01K 1/0245 |
| 2020/0288670 | A1 | * | 9/2020 | DeMichael ............ A01K 13/00 |
| 2023/0397574 | A1 | * | 12/2023 | Kacic ................... A01K 15/024 |
| 2025/0160299 | A1 | * | 5/2025 | Spruill ................. A01K 15/024 |

FOREIGN PATENT DOCUMENTS

| | | | | |
|---|---|---|---|---|
| JP | | H10117623 | A | * 5/1998 |
| JP | | 2018050476 | A | * 4/2018 |

* cited by examiner

*Primary Examiner* — Christopher D Hutchens
(74) *Attorney, Agent, or Firm* — Sam Pierce

(57) ABSTRACT

A cat enrichment puzzle box designed to provide a stress-free alternative to traditional nail trimming methods. The invention features sandpaper or abrasive material placed within the internal structure of the box. This material interacts with a cat's claws during natural behaviors such as pawing and scratching, gently filing the nails over time. The box includes interactive features to engage a cat's instincts, promoting mental stimulation, physical activity, and grooming benefits in a single device. The sandpaper is securely affixed, replaceable, and available in varying grit levels to suit different grooming needs.

1 Claim, 4 Drawing Sheets

3. Treat Holes

1. Housing Structure

7. Replacement Sandpaper Piece: 120 grit sandpaper

2. Entry Points

8. Adhesive backing

3. Treat Holes                    1. Housing Structure

2. Entry Points

4. Sandpaper Lining: positioned
on all inside surfaces to ensure
natural claw engagement.

5. Sandpaper Surface: 120 grit sandpaper glued to inside surfaces for nail filing.

6. Cat Interaction Points: Areas where claws naturally come into contact with sandpaper.

7. Replacement Sandpaper
Piece: 120 grit sandpaper ————————

8. Adhesive backing ————————

CAT NAIL FILE ENRICHMENT BOX

BACKGROUND OF THE INVENTION

The grooming of cats, specifically trimming their nails, can often be a stressful experience for both pets and their owners. Traditional methods involve manual nail clipping, which requires restraint and can result in anxiety or resistance from the animal. This invention addresses the need for a low-stress, natural alternative by integrating a nail-filing mechanism into a cat enrichment puzzle box. This approach leverages a cat's natural behaviors to achieve grooming benefits without conscious effort or stress.

SUMMARY OF THE INVENTION

The present invention is a cat enrichment puzzle box designed to provide a safe and stress-free alternative to traditional nail trimming. The device incorporates sandpaper or similar abrasive materials strategically placed inside the puzzle box. This material interacts with the cat's claws during normal play behaviors, such as pawing and foraging, thereby filing the nails gradually and naturally. The invention combines the benefits of mental stimulation, physical activity, and grooming into a single product.

DETAILED DESCRIPTION

Figure 1:
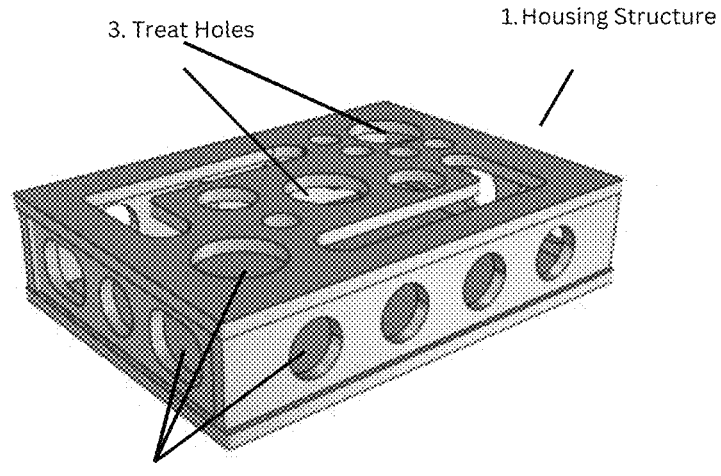
FIG. 1 illustrates an overall puzzle box design.
Figure 2:
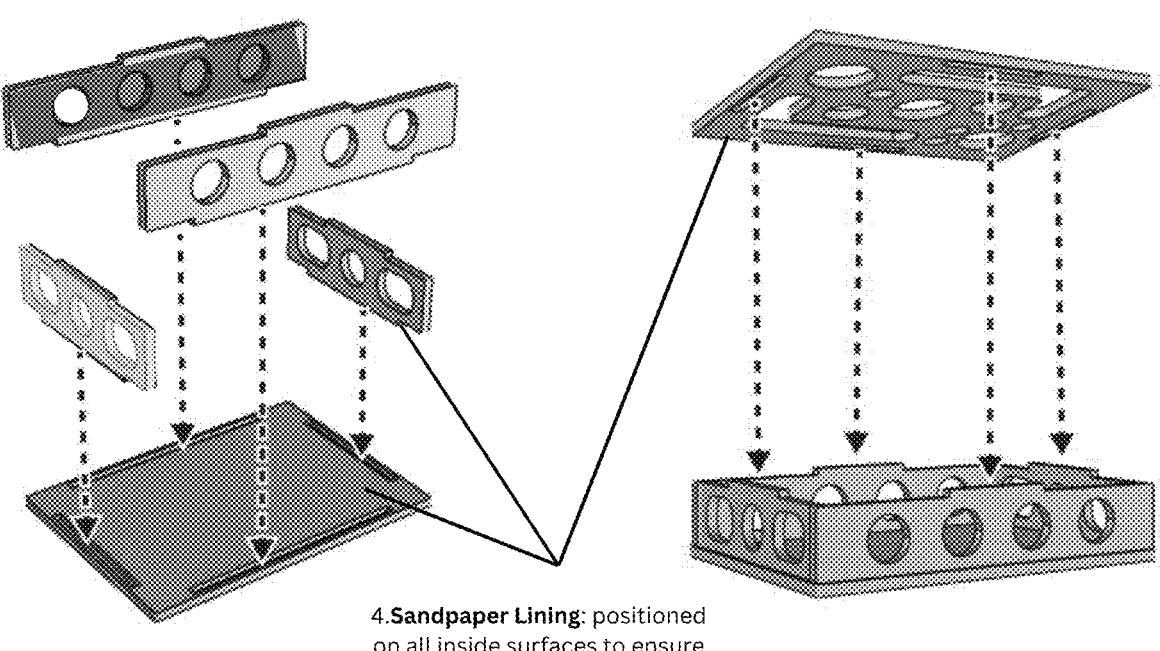
FIG. 2 illustrates an internal layout.
Figure 3:
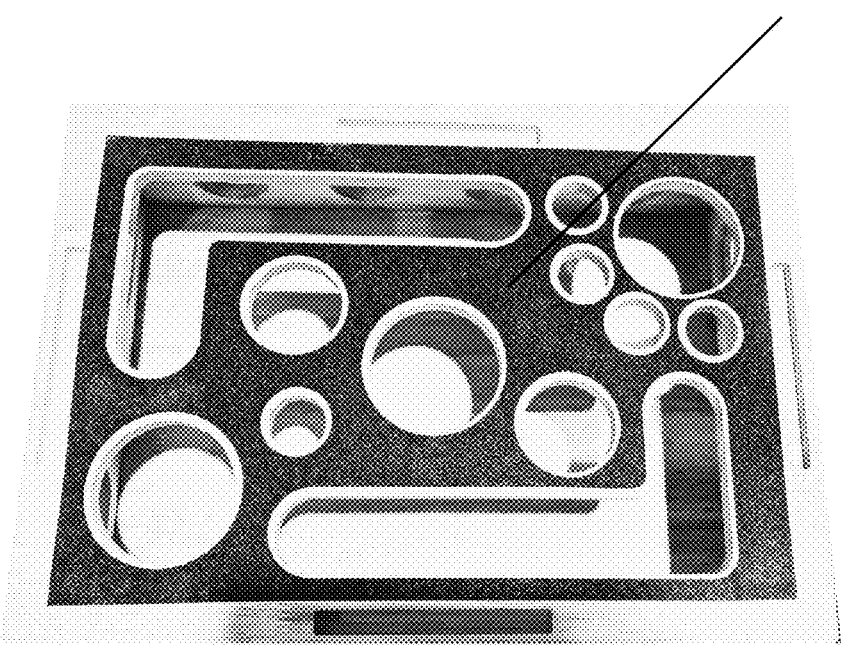
FIG. 3 illustrates sandpaper placement.
Figure 4:
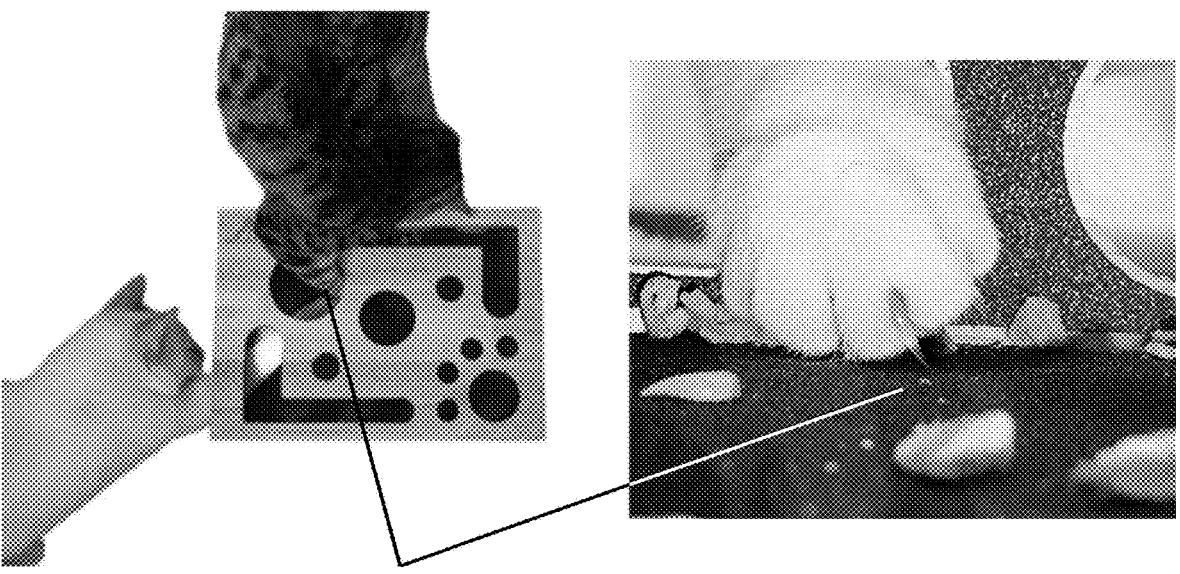
FIG. 4 illustrates interactivity examples.
Figure 5:
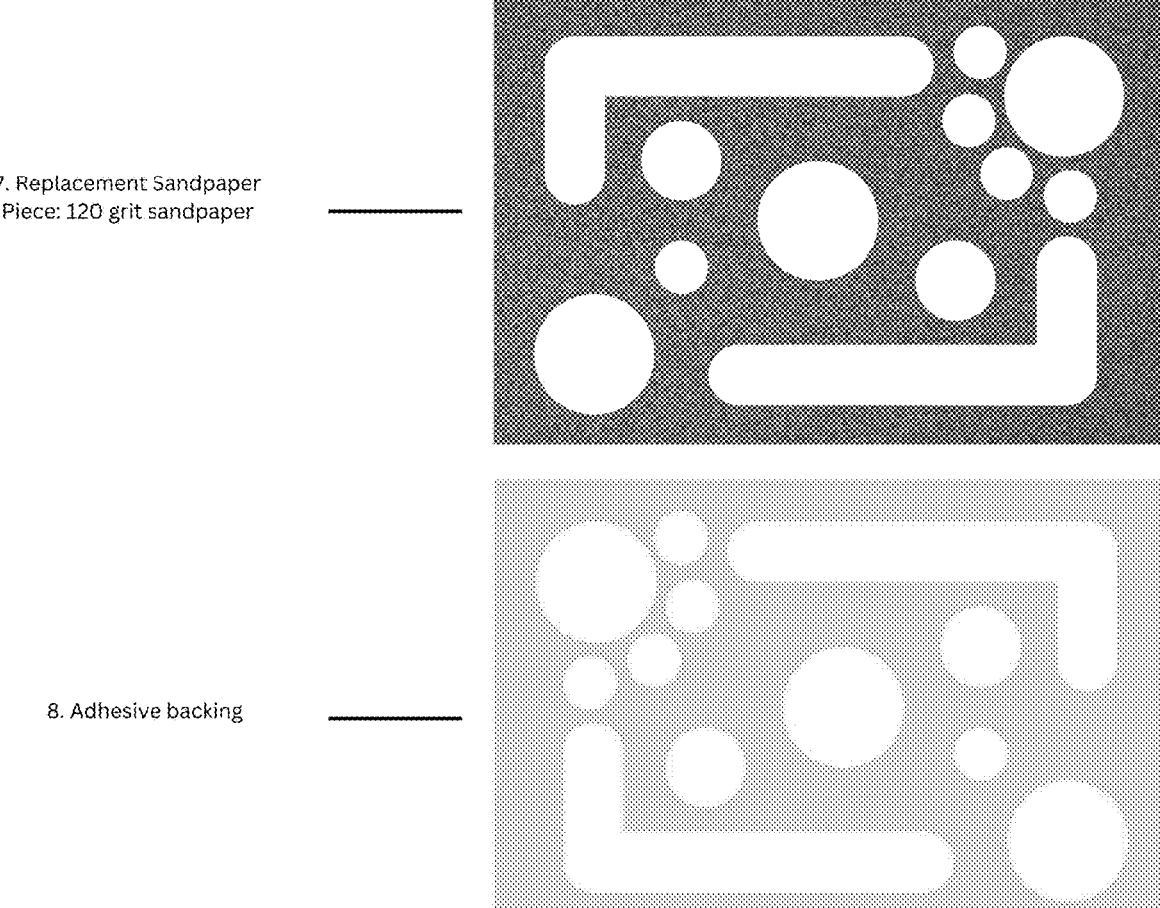
FIG. 5 illustrates a replaceable sandpaper mechanism.
Figure 6:
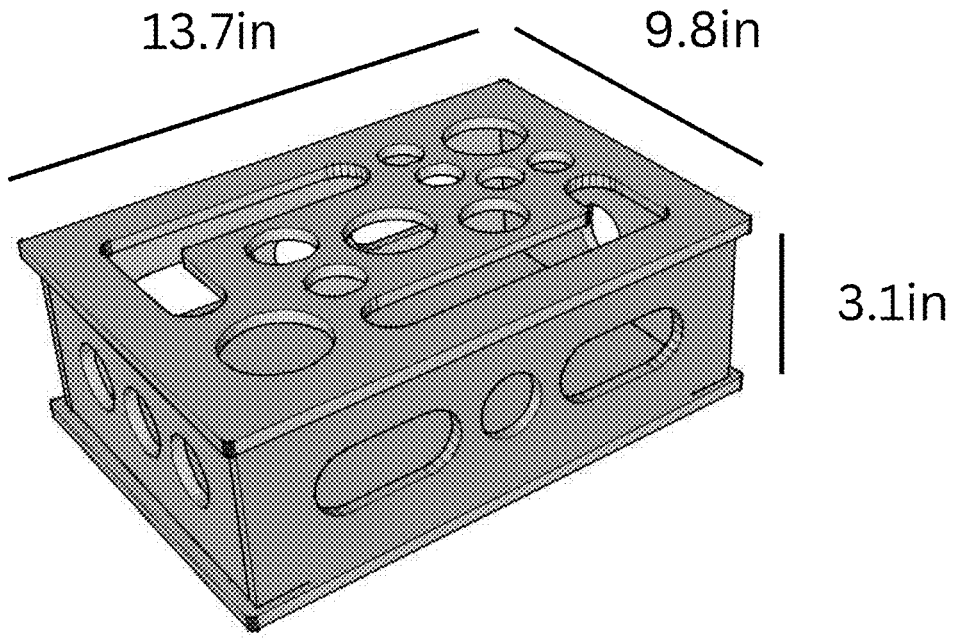
FIG. 6 illustrates dimensions of an embodiment.

The enrichment puzzle box consists of a housing structure with multiple interactive features designed to engage a cat's curiosity and instincts. These features include, but are not limited to, tunnels, ramps, treat compartments, sliding panels, and scratching surfaces. The interior surfaces of these features are lined with abrasive sandpaper materials.

The sandpaper is securely affixed to prevent accidental removal and is positioned to make controlled contact with the cat's claws during interaction. To ensure safety, the abrasive material avoids direct contact with paw pads or skin. Additionally, the sandpaper is designed to be replaceable, allowing for maintenance and customization based on the cat's specific grooming needs.

What is claimed is:
1. A Cat Nail File Enrichment Box, comprising:
a housing having a top, a bottom, and four sides;
a plurality of holes on each of the top and each of the four sides forming interactive features for a cat; and
six replaceable sandpaper mechanisms to attach to the top, bottom, and side inside surfaces of the housing comprising six sandpaper pieces each with an adhesive backing;
wherein five of the sandpaper pieces and adhesive backings attached to the top and four sides respectively each have a plurality of holes matching the respective plurality of holes on the top and each of the four sides;
wherein each of the sandpaper pieces can be replaced and new sandpaper pieces can be securely affixed on the inside surfaces of the housing.

\* \* \* \* \*